US006941673B1

(12) United States Patent  (10) Patent No.: US 6,941,673 B1
Chen et al.  (45) Date of Patent:  Sep. 13, 2005

(54) MULTI-FUNCTION CLOSED-TYPE DRYING SYSTEM WITH SOLAR ENERGY COLLECTION ARRANGEMENT

(75) Inventors: Ho Hsien Chen, Pingtung (TW); Jwo Jyh Huang, Pingtung (TW)

(73) Assignee: National Pintung University of Science and Technology, Pingtung (TW)

( * ) Notice: Subject to any disclaimer, the term of this patent is extended or adjusted under 35 U.S.C. 154(b) by 8 days.

(21) Appl. No.: 10/867,064

(22) Filed: Jun. 12, 2004

(51) Int. Cl.⁷ .............................................. F26B 19/00
(52) U.S. Cl. ...................... 34/76; 34/77; 34/93; 34/203
(58) Field of Search .......................... 34/262, 264, 265, 34/275, 73, 75, 76, 77, 93

(56) References Cited

U.S. PATENT DOCUMENTS

| 4,440,861 A | * | 4/1984 | McCarthy | 435/289.1 |
| 5,119,571 A | * | 6/1992 | Beasley | 34/446 |
| 6,233,841 B1 | * | 5/2001 | Beach | 34/262 |
| 6,243,968 B1 | * | 6/2001 | Conrad et al. | 34/255 |
| 6,321,460 B1 | * | 11/2001 | Jin | 34/77 |

* cited by examiner

Primary Examiner—Stephen Gravini
(74) Attorney, Agent, or Firm—Pro-Techtor International Services

(57) ABSTRACT

A closed-type drying system a drying chamber with glass windows to allow light entering, an condensation and heating system connected between two distal ends of the drying chamber and controlled by an automatic control system, the condensation and heating system including an air blower for blowing air through the drying chamber, a heater for heating air passing through the drying chamber, two evaporators for condensing moisture from output air of the drying chamber, a heat energy reclamation chamber connected between the air blower and the evaporator, a condenser mounted inside the heat energy reclamation chamber for preheating air passing through the heat energy reclamation chamber, a first compressor mounted in the heat energy reclamation chamber for heat exchange with the flow of air passing through reclamation chamber, and a second compressor adapted to provide low temperature conditions (if needed) in the drying chamber.

7 Claims, 9 Drawing Sheets

| | Operation temperature range (°C) | Power (kw) | Function |
|---|---|---|---|
| Compressor 1 (including heat reclamation system) | 43~45 °C (temperature will change if heater on) | 1.87kw | Drying |
| Compressor 2 | 10 °C (temperature will change if heater on) | 1.87kw | Cooling and preservation |
| Compressor 1 (including heat reclamation system) + Compressor 2 | 25 °C (temperature will change if heater on) | 3.74kw | Low-temperature drying |

FIG. 4

|  | Capacity (kg) | Maximum wind speed (m/s) | Total power (kw) | Heater (%) | Drying time (hr) | Cost (NT$/kg) | 43°C thermostat drying |
|---|---|---|---|---|---|---|---|
| Hot-air drying system | 30kg | 5 m/s | 8.0kw | 91% | 6 | 3.2 | 8.0kw |
| Low temperature drying system 1 | 30kg | 4 m/s | 7.0kw | 63% | 9 | 6.3 | 7.0kw |
| Low temperature drying system 2 | 60kg | 5 m/s | 11.9kw | 76% | 8 | 4.476 | 11.9kw |
| Closed-type Solar drying system | 150kg | 9 m/s | 7.2kw | 0% | 7 | 0.322 | 2.3kw |

FIG. 6

FIG. 8 - (a)
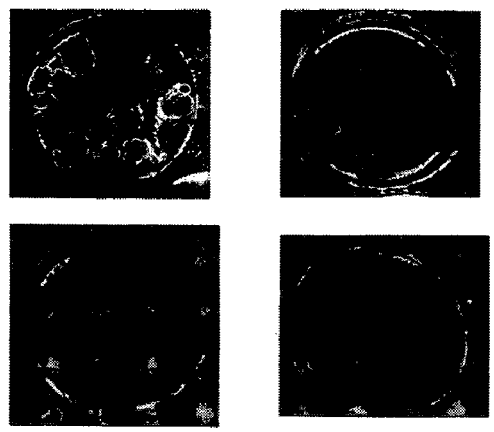
FIG. 8 - (b)
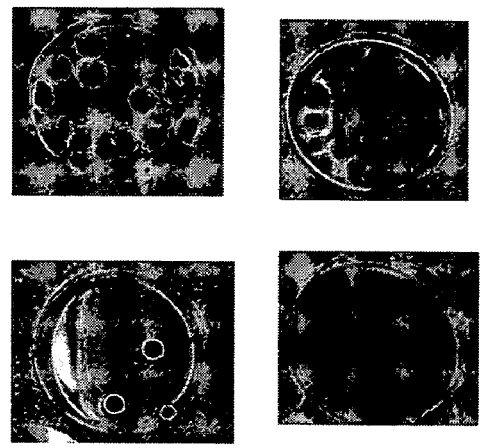
FIG. 8 - (c)
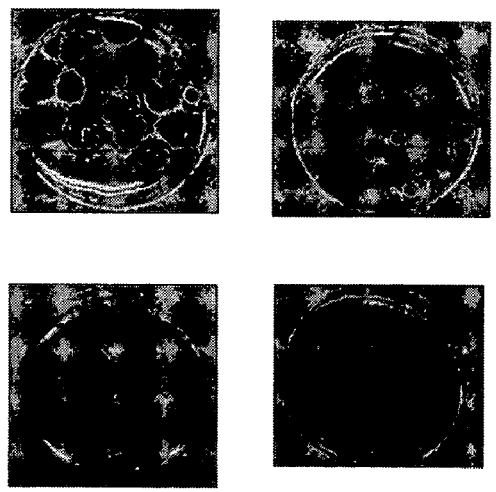

US 6,941,673 B1

MULTI-FUNCTION CLOSED-TYPE DRYING SYSTEM WITH SOLAR ENERGY COLLECTION ARRANGEMENT

BACKGROUND OF THE INVENTION

1. Field of the Invention

The present invention relates to a closed-type drying system for drying agri-food products and more particularly, to such a closed-type drying system, which utilizes and complements the heat from sun radiation to dry agri-food products and, photocatalyst was sprayed within the chamber to kill the bacteria as catalyzed by ultraviolet of sunshine.

2. Description of the Related Art

Drying agricultural products is to lower the moisture content, to reduce the weight of volume, and to extend the preservation time or shelf life without affecting the taste. Taiwan utility model Patent No.203526 discloses a drying system for this purpose. This drying system comprises a drying chamber, an air blower adapted to blow air through the drying chamber, an evaporator adapted to condense moisture from hot wet air passing through the drying system, a condenser adapted to preheat air coming from the evaporator, and a heater adapted to heat air (to reach a specific temperature if needed) passing into the drying chamber. This design of drying system is functional; however it can save electric energy during operation. Taiwan utility model Patent Publication No.577534, (issued on Feb. 21, 2004) showed that the use of solar energy for drying agricultural products to reduce consumption of electric energy.

SUMMARY OF THE INVENTION

The present invention has been accomplished under the circumstances in view. It is one object of the present invention to provide a closed-type drying system, which utilizes solar energy for drying application to reduce consumption of electric energy. It is another object of the present invention to provide a closed-type drying system, which utilizes ultraviolet light or sunshine to catalyze the photocatalyst containing titanium dioxide, and to further convert surrounding oxygen or water molecules into OH⁻ free radicals that decompose organic substances, achieving the desired sterilization and bad smell removing effects.

According to one aspect of the present invention, the closed-type drying system comprises a drying chamber, the drying chamber comprising a plurality of white glass windows formed in peripheral walls thereof for enabling the radiation energy of the sun to pass to the inside of the drying chamber; a condenser (used for preheating circulating air) installed at the end of the drying chamber and connected to an air blower adapted to send a flow of air through the drying chamber, a heater adapted to heat the flow of air passing through the drying chamber, two evaporators adapted to condense moisture from the flow of air-vapor mixture coming out of the drying chamber, a heat energy reclamation chamber connected between the air blower and the evaporator, a condenser mounted inside the heat energy reclamation chamber and adapted to preheat the flow of air passing through the heat energy reclamation chamber, a first compressor mounted in the heat energy reclamation chamber and adapted for heat exchange and preheat the flow of air passing through reclamation chamber, and a second compressor adapted to provide low temperature conditions (if needed) in the drying chamber of this closed-type drying system; and an automatic control system, which controls the operation of the air blower, the heater, the evaporators, the condenser, the first compressor, and the second compressor.

According to another aspect of the present invention, the drying chamber has an inside wall thereof sprayed with a layer of photocatalyst.

According to still another aspect of the present invention, the drying chamber comprises a reflection mirror at a rear side for reflecting the radiation of the sunshine onto the inside walls of the drying chamber.

BRIEF DESCRIPTION OF THE DRAWINGS

FIG. 4 is a table explaining different functions of the closed-type drying system according to the present invention.

FIG. 6 is a cost analysis chart showing the drying cost per kg of different drying systems.

FIG. 8-(*a*)-(*b*)-(*c*) are photos obtained from the test of FIG. 7, where 8-(*a*) shows the upper layer of the drying system; 8-(*b*) shows the bottom layer of the drying system; 8-(*c*) shows the intermediate layer of the drying system.

DETAILED DESCRIPTION OF THE PREFERRED EMBODIMENT

Figure 1:
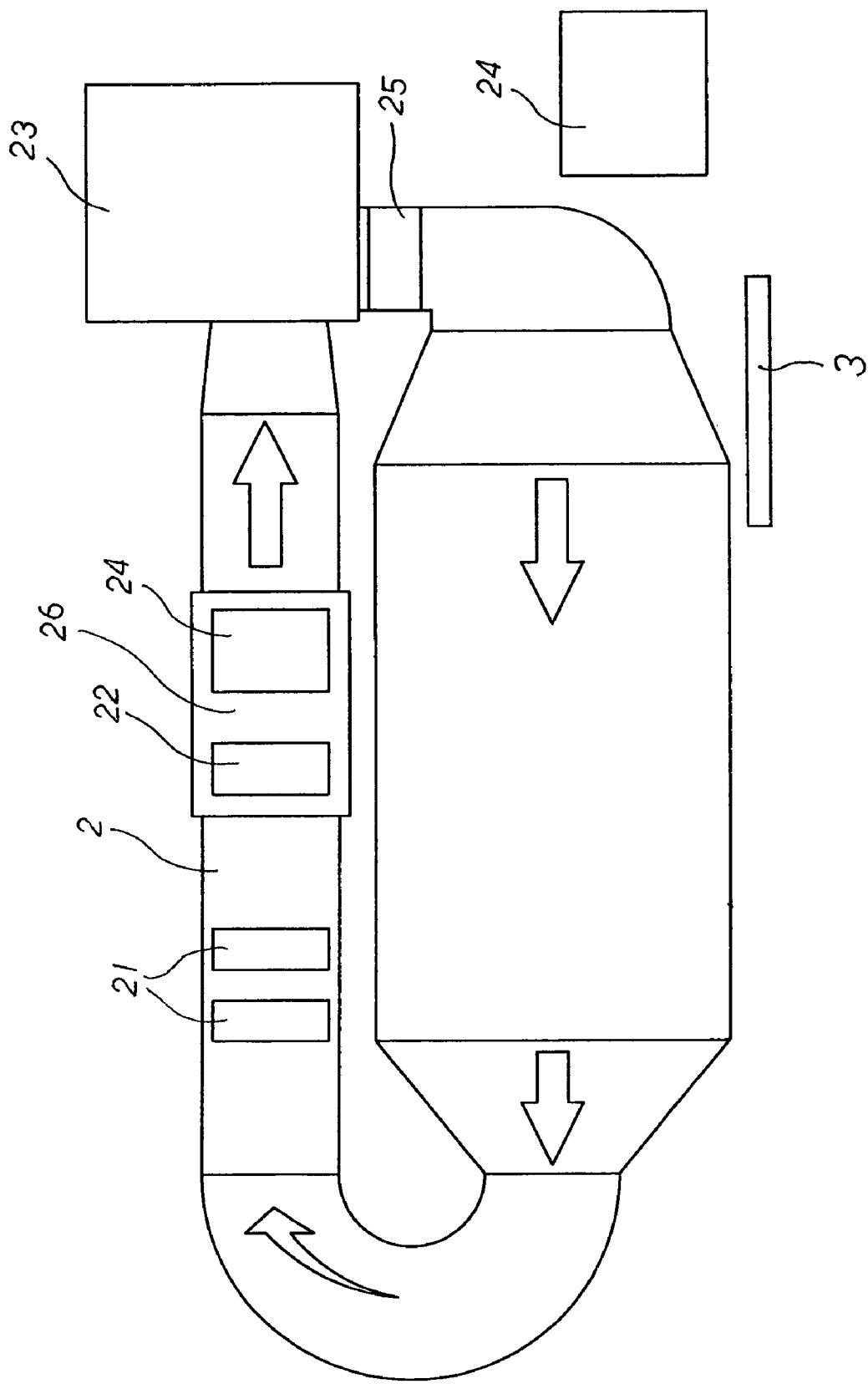
FIG. 1 is a schematic top view of a closed-type drying system according to the present invention.

Referring to FIG. 1, a closed-type drying system in accordance with the present invention comprises a drying chamber 1, a condensation and heating system 2, and an automatic control system 3.

Figure 2:
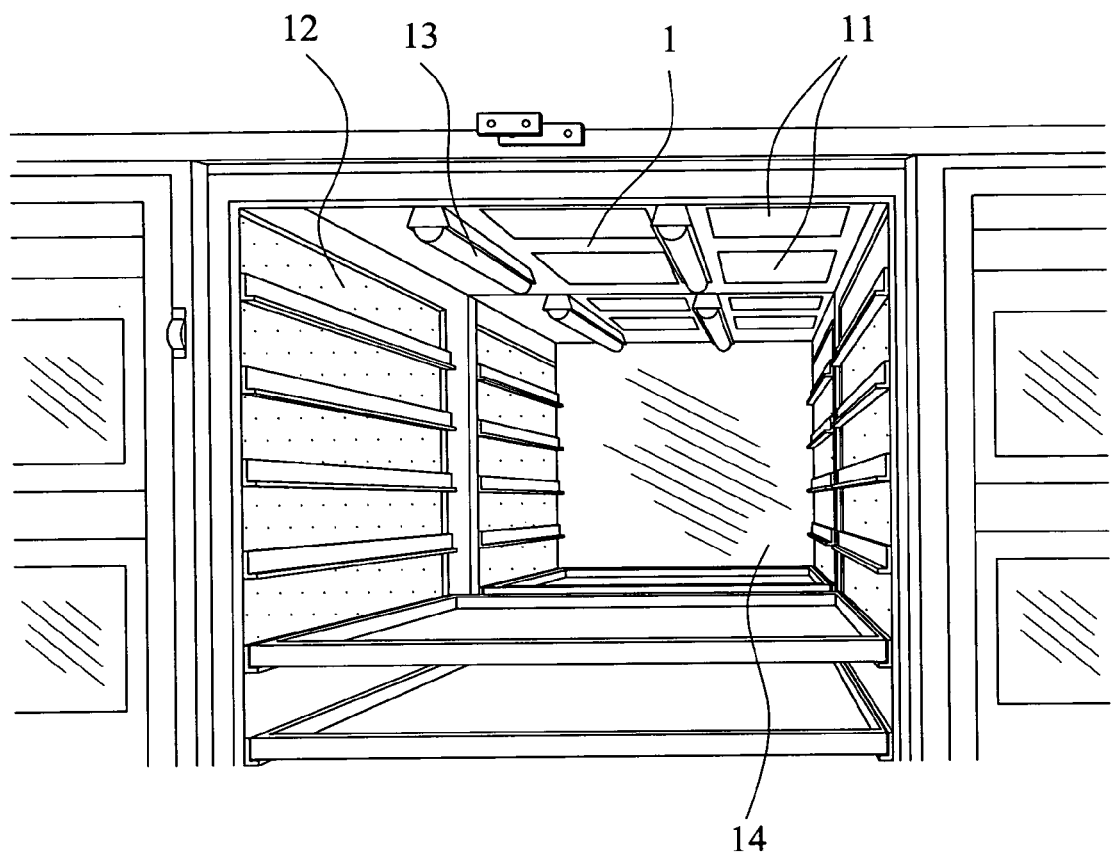
FIG. 2 illustrates the internal structure of the drying chamber according to the present invention.

Referring to FIG. 2 and FIG. 1 again, the drying chamber 1 comprises a plurality of white glass windows 11 formed in the front, top, left and right sidewalls that allows sunshine entering and enabling the radiation energy of the sun to be used and to complement the heat in the dry process or the like, the photocatalyst 12 sprayed on the inside walls, ultraviolet lamps 13 mounted on the inside and adapted to sterilize foods or the like, and a reflection mirror 14 provided at the inner surface of the rear wall.

The condensation and heating system 2 is electrically connected to the automatic control system 3, having two distal ends respectively connected to the front and rear sides of the drying chamber 1. The condensation and heating system 2 is controlled by the automatic control system 3 to send a circulating flow of air through the drying chamber 1, to heat the circulating flow of air, and to remove moisture from the circulating flow of air. The condensation and heating system 2 comprises two evaporators 21, a condenser 22, an air blower 23, two compressors 24, a heater 25, and a heat energy reclamation chamber 26. During drying process, the air blower 23 is controlled by the automatic control system 3 to blow air through the drying chamber 1, and the heater 25 is controlled by the automatic control system 3 to heat the air that flows into the drying chamber to a specific temperature 1. The hot wet output flow of air from the drying chamber 11 passes through the evaporators 21 and then the condenser 22 and one compressor 24 in the heat energy reclamation chamber 26. The evaporators 21 condense moisture from the flow of air-vapor mixture passing from the drying chamber 1 to the heat energy reclamation chamber 26, wherein the condenser 22 preheats the flow of air passing through the heat energy reclamation chamber 26 and the compressor 24 exchanges heat with the flow of air toward the air blower 23 for further circulation through the drying chamber 1. Further the condenser 22 has a heater connected thereto. The other compressor 24 is disposed on the outside of the drying system.

Figure 3:
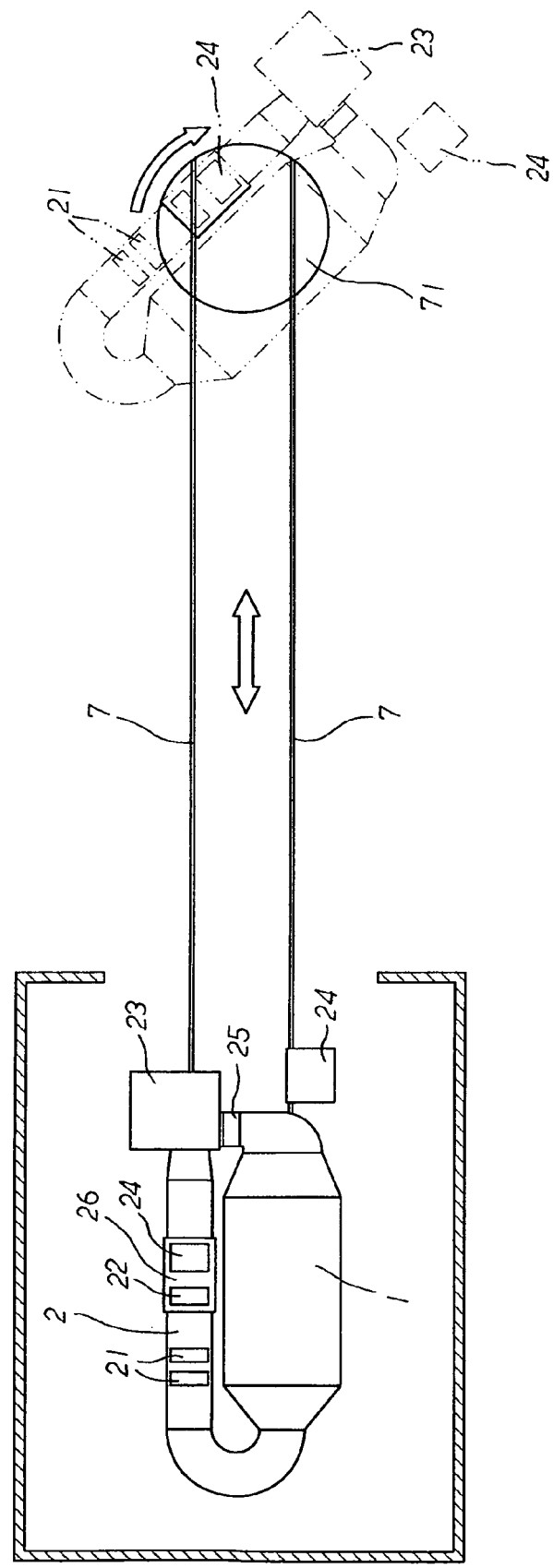
FIG. 3 is a schematic drawing showing the master track extended out of the house according to the present invention.
Figure 3A:
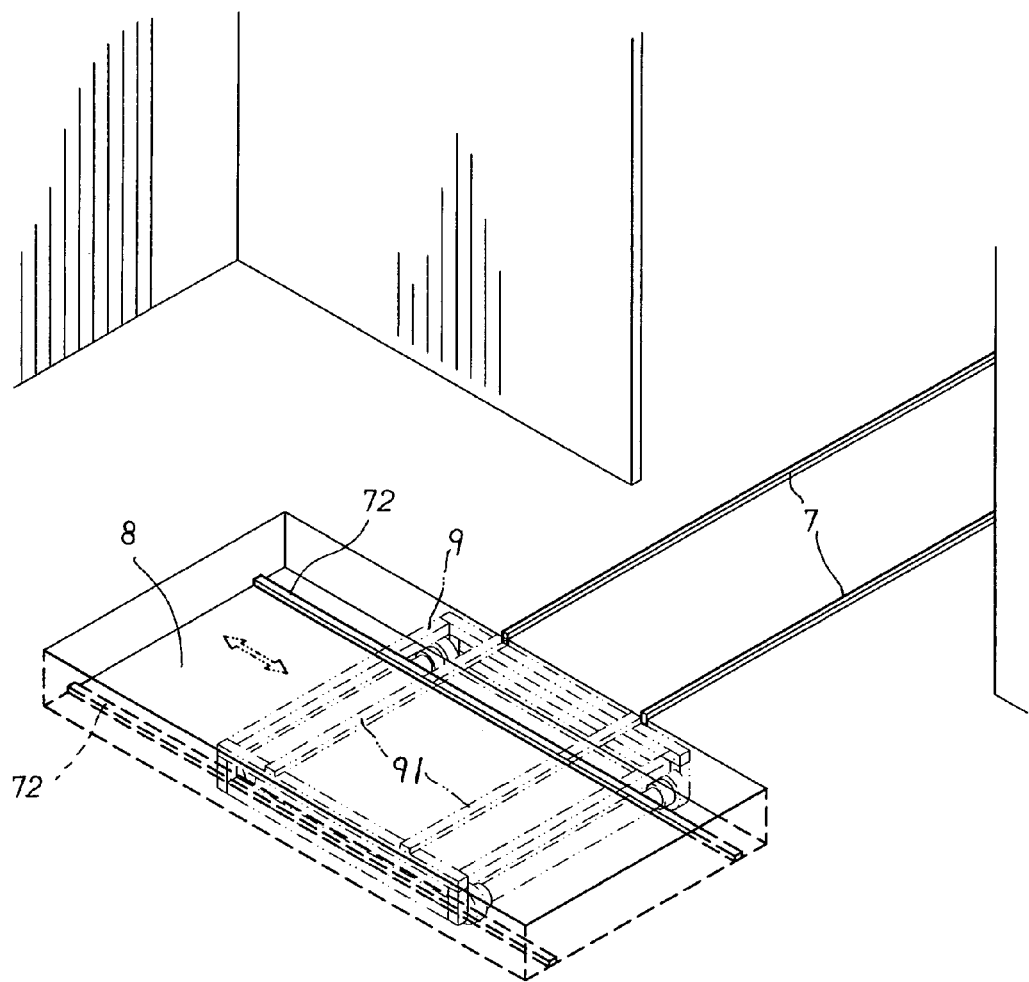
FIG. 3A is a schematic drawing an auxiliary track set in a recessed chamber inside the house and a carriage supported on the auxiliary track according to the present invention.

The closed-type drying system may be set inside the house. As shown in FIG. 3, a master track 7 extended from the inside of the house to a distance outside the house. The closed-type drying system can be moved in and out of the house through the master track 7. The master track 7 comprises a whirling plate 71 at the end of the track where the closed-type drying system can be turned horizontally through a 360° rotation to fit the proper angle of the sunshine. As illustrated in FIG. 3A, an inside track 72 is set in a hollow chamber 8 inside the house and extended in direction perpendicular to the master track 7. A carriage 9 is supported on the inside track 72. The carriage 9 comprises a pair of rails 91 fitting the track 7. The carriage 9 can be moved along the inside track 72 to the position where the rails 91 are in alignment with the master track 7 for enabling the closed-type drying system to be moved from the master track 7 to the carriage 9.

The necessary working electricity for the condensation and heating system 2 can be switched to and obtained from electrical grid or a photovoltaic system (PV) and a battery set. The PV system and battery set converts the radiation of the sunshine into electricity and then stores the electricity thus obtained in a battery. The PV system and battery set may be connected in parallel to electrical grid. The main feature of the present invention is power saving. As indicated above, the condenser 22 and one compressor 24 are mounted in the heat energy reclamation chamber 26 for reclamation of heat energy. At the initial stage after starting of the closed-type drying system, the two evaporators 21 and the compressor 24 in the heat energy reclamation chamber 26 are operated. During drying process, the automatic control system 3 detects the temperature in the condensation and heating system 2 and controls the operation of the heater 25 subject to the detection result, thereby saving consumption of power. The operation of the evaporators 21 and the condenser 22 keep the agri-food product in a low humility environment at some temperature. The automatic control system 3 automatically controls switching between the two compressors 24 and the operation of the heater 25, the closed-type drying system performs three functions, namely, the drying function, the cooling and preservation function, and the low-temperature drying function as shown in FIG. 4.

Figure 5:
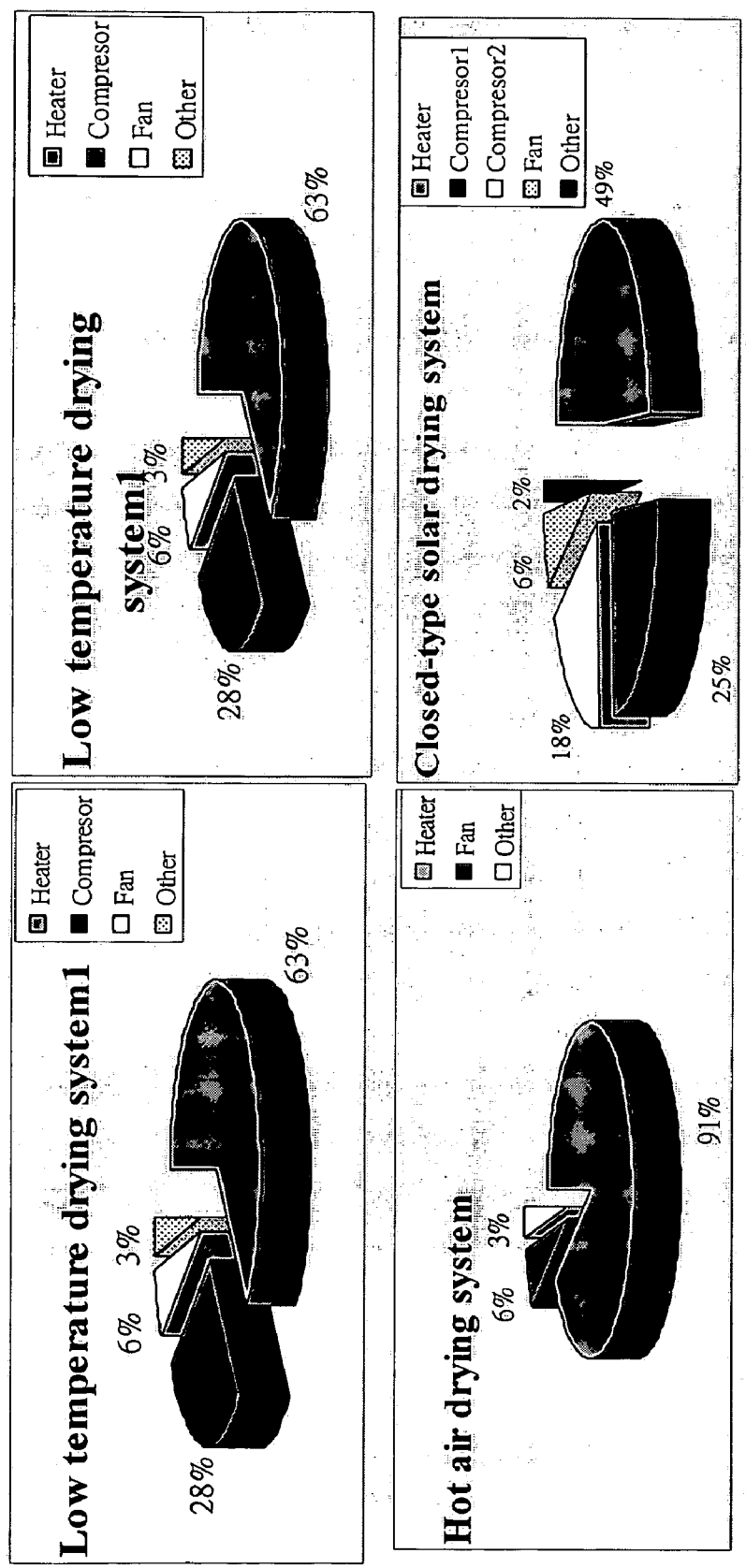
FIG. 5 is a power consumption chart, showing the power consumption rate of every component in different drying systems.

FIG. 5 is a power consumption chart, showing the power consumption rate of every component in different drying systems. As indicated, the power consumption rate of the heater is over 63% of total power consumption of any of the prior art designs; the power consumption rate in the solar energy drying system of the present invention is about 33% of total power consumption of the drying system if without switching on heater (the power for heater can be zero).

Under the complement of solar energy, the drying chamber of the drying system can be maintained at 43° C. without switching on the heater.

FIG. 6 is a cost analysis chart showing the drying cost per NT$/kg of different prior art drying systems and the solar energy drying system of the present invention. As indicated, the drying cost of the present invention is much lower than the prior art designs.

Figure 7:
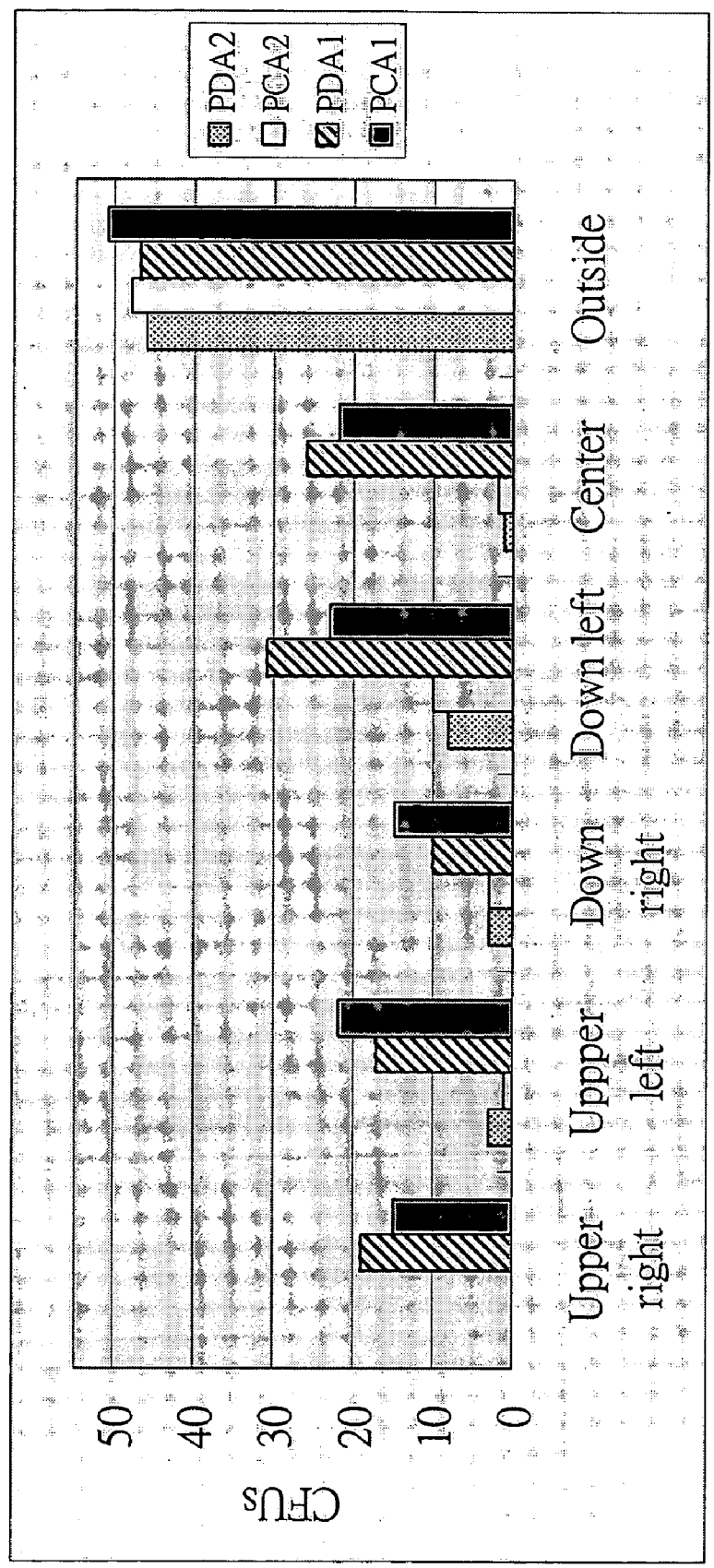
FIG. 7 is a chart of the bacteria count on the closed-type drying system that showed the results before/after spraying with the photocatalyst.

FIG. 7 is a chart of the bacteria count on the closed-type drying system before/after using the photocatalyst. FIG. 8-(a)-(b)-(c) are photos obtained from the test of FIG. 7, where 8-(a) shows the upper layer of the drying system; 8-(b) shows the bottom layer of the drying system; 8-(c) shows the intermediate layer of the drying system. When moved the closed-type drying system (solar energy drying system) of the present invention to the outside of the house to receive radiation of the sun, the light of the sun could enter through the white glass windows 11 to dry agricultural products in the drying chamber. This solar energy drying process could keep the good taste of the products. Further, the radiation of the ultraviolet light from the sunshine or the ultraviolet lamps 13 catalyzes titanium dioxide in the photocatalyst to convert oxygen and water in air into $OH^-$ free radicals and negative oxygen ions that decompose organic substances at the contact surface. Therefore, the invention effectively sterilizes agricultural products under drying, and removes bad smell from the products. Repeated tests exhibits bacteria count reduction to 2–3 CFU, or even to zero reading. As indicated, the bacteria count can be as high as 32 CFU without the application of photocatalyst paint. After application of photocatalyst paint, the bacteria count could be reduced to 2–3 CFU or zero.

Further, the reflection mirror 14 reflects the light of the sun onto the inside of the drying chamber, enhancing the radiation of sun to reach the each place of the drying chamber. After having moved to the whirling plate 71 of the master track 7, the closed-type drying system can be turned horizontally to the optimum angle where sufficient radiation of the sun can pass to the inside of the drying chamber.

A prototype of closed-type drying system has been constructed with the features of FIGS. 1~3. The closed-type drying system functions smoothly to provide all of the features discussed earlier.

Although particular embodiments of the invention have been described in detail for purposes of illustration, various modifications and enhancements may be made without departing from the spirit and scope of the invention.

What the invention claimed is:

1. A closed-type drying system comprising:
   a drying chamber, said drying chamber comprising a plurality of white glass windows formed in peripheral walls thereof for enabling the radiation energy of the sun to pass to the inside of said drying chamber;
   a condensation and heating system connected between two distal ends of said drying chamber and forming with said drying chamber a circulation loop, said condensation and heating system comprising an air blower adapted to blow a flow of air through said drying chamber, a heater adapted to heat the flow of air passing through said drying chamber, two evaporators adapted to condense moisture from the flow of air passing out of said drying chamber, a heat energy reclamation chamber connected between said air blower and said evaporator, a condenser mounted inside said heat energy reclamation chamber and adapted to preheat the flow of air passing through said heat energy reclamation chamber, a first compressor mounted in said heat energy reclamation chamber and adapted to exchange heat with the flow of air passing from said evaporators to said heat energy reclamation chamber, and a second compressor adapted to provide low temperature conditions in the drying chamber; and an automatic control system, which controls the operation of said air blower, said heater, said evaporators, said condenser, said first compressor, and said second compressor.

2. The closed-type drying system as claimed in claim 1, wherein said drying chamber has an inside wall thereof sprayed with a layer of photocatalyst.

3. The closed-type drying system as claimed in claim 2, wherein said drying chamber comprises a reflection mirror at a rear side for reflecting the radiation of the sun onto the inside of said drying chamber.

4. The closed-type drying system as claimed in claim 2, further comprising a master track extended from the inside of a house to the outside of said house and adapted to support the assembly of said drying chamber and said condensation and heating system and said automatic control system for enabling the assembly to be moved in and out of said house.

5. The closed-type drying system as claimed in claim 4, wherein said master track comprises a whirling plate for enabling the assembly of said drying chamber and said condensation and heating system and said automatic control system to be turnable horizontally through 360° rotation outside said house.

6. The closed-type drying system as claimed in claim 2, said second compressor is disposed on the outside of said condensation and heating system.

7. The closed-type drying system as claimed in claim 5, further comprising a hollow chamber inside said house, an auxiliary track set in said hollow chamber and extended in direction perpendicular to said master track, and a carriage mounted on and movable along said auxiliary track, said carriage comprising a pair of transversely extended rails corresponding to said master track for receiving the assembly of said drying chamber and said condensation and heating system and said automatic control system from said master track for enabling the assembly of said drying chamber and said condensation and heating system and said automatic control system to be moved with said carriage along said auxiliary track.

* * * * *